(12) United States Patent
Luo

(10) Patent No.: US 12,095,937 B2
(45) Date of Patent: Sep. 17, 2024

(54) ELECTRONIC DEVICE

(71) Applicant: VIVO MOBILE COMMUNICATION CO., LTD., Dongguan (CN)

(72) Inventor: Zhengwu Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 193 days.

(21) Appl. No.: 17/971,144

(22) Filed: Oct. 21, 2022

(65) Prior Publication Data

US 2023/0041843 A1    Feb. 9, 2023

Related U.S. Application Data

(63) Continuation of application No. PCT/CN2021/089223, filed on Apr. 23, 2021.

(30) Foreign Application Priority Data

Apr. 26, 2020    (CN) .......................... 202010338949.8

(51) Int. Cl.
*H04R 1/02*      (2006.01)
*H04M 1/02*      (2006.01)

(52) U.S. Cl.
CPC .......... *H04M 1/0264* (2013.01); *H04R 1/025* (2013.01); *H04M 2250/52* (2013.01); *H04R 2499/11* (2013.01)

(58) Field of Classification Search
CPC ....................................................... H05K 5/00
See application file for complete search history.

(56) References Cited

U.S. PATENT DOCUMENTS

2004/0204055 A1   10/2004   Nousiainen
2020/0266845 A1*   8/2020   Kumar .................. G06F 1/1688

FOREIGN PATENT DOCUMENTS

CN     203219475 U    9/2013
CN     103596102 A    2/2014
CN     205921740 U    2/2017
(Continued)

OTHER PUBLICATIONS

European Patent Office, Extended European Search Report issued in corresponding Application No. EP 21797140, dated Sep. 29, 2023.
(Continued)

*Primary Examiner* — Jerry Wu
(74) *Attorney, Agent, or Firm* — Stites & Harbison, PLLC; Jeffrey A. Haeberlin

(57) ABSTRACT

The embodiments of the present application disclose an electronic device, and the electronic device includes: a device body and a camera apparatus, where a sound-emitting device is installed in the device body, a first sound cavity is provided on the device body, the first sound cavity has an opening that communicates with the outside, the camera apparatus is detachably installed in the first sound cavity, in a case that the camera apparatus is installed in the first sound cavity, the sound cavity of the sound-emitting device has a first volume value, in a case that the camera apparatus is separated from the device body, the sound cavity of the sound-emitting device extends toward the first sound cavity and has a second volume value, and the first volume value is smaller than the second volume value.

16 Claims, 3 Drawing Sheets

(56) References Cited

FOREIGN PATENT DOCUMENTS

| | | |
|---|---|---|
| CN | 208353378 U | 1/2019 |
| CN | 109324780 A | 2/2019 |
| CN | 111526453 A | 8/2020 |
| CN | 112600963 A | 4/2021 |
| JP | 2002-152357 A | 5/2002 |
| JP | 2002-374447 A | 12/2002 |
| WO | 2009/085796 A2 | 7/2009 |

OTHER PUBLICATIONS

Japan Patent Office, Grant Decision issued in corresponding Application No. JP 2022-562450, mailed on Mar. 12, 2024. (Translation not available.).

Japan Patent Office, First Office Action issued in corresponding Application No. JP 2022-562450, mailed on Nov. 7, 2023. (Translation not available.).

China National Intellectual Property Administration, International Search Report issued in corresponding Application No. PCT/CN2021/089223, mailed Jun. 30, 2021.

\* cited by examiner

ELECTRONIC DEVICE

CROSS-REFERENCE TO RELATED APPLICATIONS

The present application is a continuation of International Application No. PCT/CN2021/089223, filed on Apr. 23, 2020, which claims priority to Chinese Patent Application No. 202010338949.8 filed in China in Apr. 26, 2020, which is incorporated herein by reference in its entirety.

TECHNICAL FIELD

The present application relates to the technical field of electronic devices, and in particular, to an electronic device.

BACKGROUND

With the development of communication technologies, intelligent electronic devices have become popular. The photographing function is one of important functions of an electronic device. The traditional electronic device is usually equipped with a camera apparatus, which is usually fixed on the electronic device. The camera apparatus usually needs to occupy an independent space in the electronic device. As a result, the volume of the electronic device is large, which is not conducive to miniaturization design of the electronic device.

SUMMARY

The embodiments of the present application provide an electronic device, including:
a device body, where a sound-emitting device is installed in the device body, a first sound cavity is provided on the device body, and the first sound cavity has an opening that communicates with the outside; and
a camera apparatus, where the camera apparatus is detachably installed in the first sound cavity;
wherein in a case that the camera apparatus is installed in the first sound cavity, the sound cavity of the sound-emitting device has a first volume value, in a case that the camera apparatus is separated from the device body, the sound cavity of the sound-emitting device extends toward the first sound cavity and has a second volume value, and the first volume value is smaller than the second volume value.

BRIEF DESCRIPTION OF DRAWINGS

To describe the technical solutions in the embodiments of the present application more clearly, the following briefly describes the accompanying drawings required in the embodiments of the present application. Apparently, the accompanying drawings in the following descriptions show merely some embodiments of the present application, and a person of ordinary skill in the art may still derive other drawings from these accompanying drawings without creative efforts.

DETAILED DESCRIPTION OF EMBODIMENTS

Figure 1:
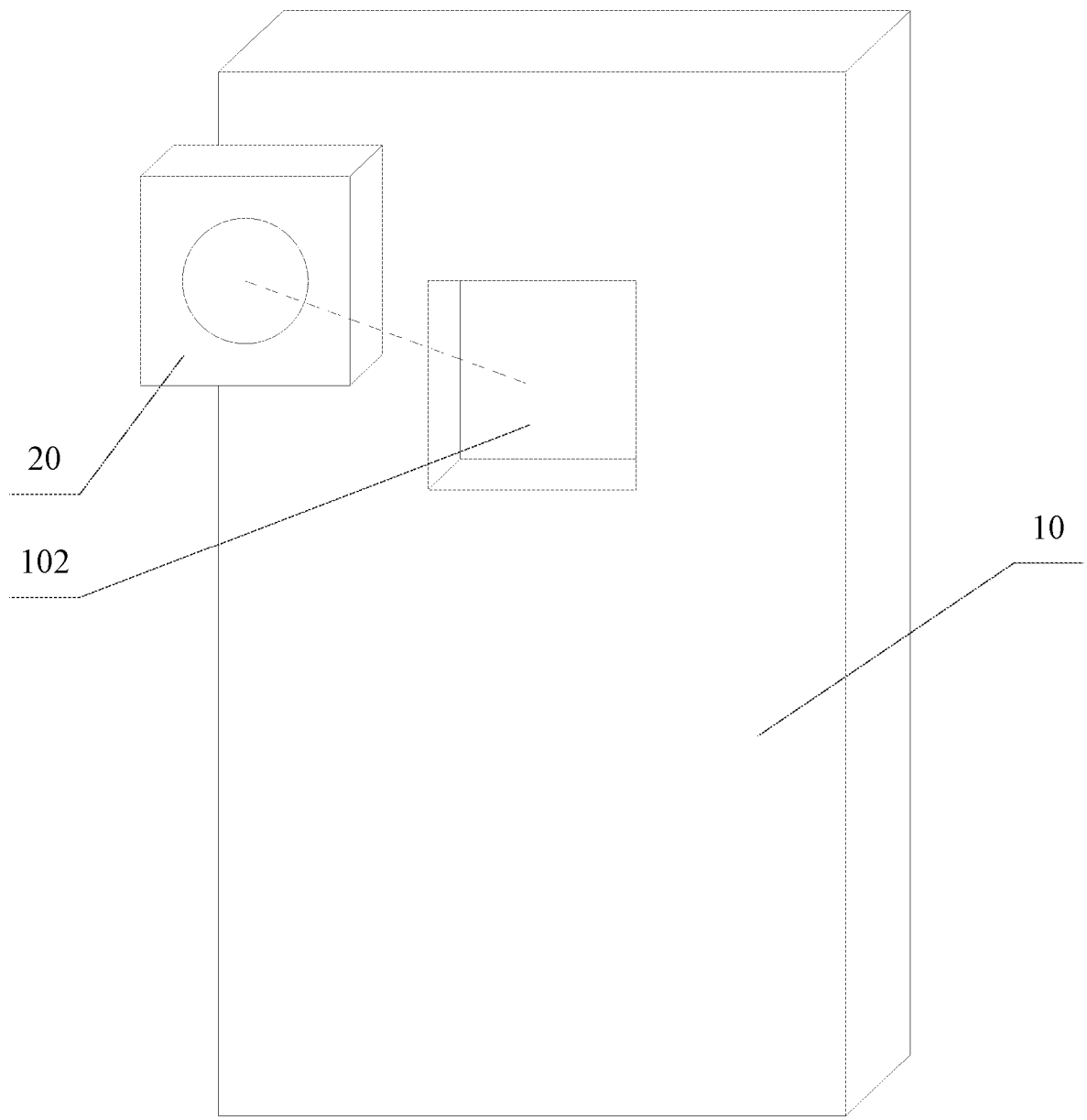
FIG. 1 is a structural diagram of an electronic device according to an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Unless otherwise defined, the technical terms or scientific terms used in the present application shall have the general meanings understood by a person of ordinary skill in the field of the present application. The "first", "second" and similar words used in the present application are only intended to distinguish different components, rather than to indicate any order, quantity or importance. Similarly, similar words such as "one piece" or "one" indicates the presence of at least one, rather than indicating a quantity limit. Similar words such as "connect" or "connection" are not limited to physical or mechanical connections, but may include electrical connections, no matter it is direct or indirect. "Upper", "lower", "left", "right", and the like are only intended to indicate a relative positional relationship. When absolute positions of the described object change, the relative positional relationship changes accordingly as well.

As shown in FIG. 1 to FIG. 5, the embodiments of the present application provide an electronic device, including:
a device body 10, where a sound-emitting device is installed in the device body, a first sound cavity 102 is provided on the device body 10, and the first sound cavity 102 has an opening that communicates with the outside; and
a camera apparatus 20, where the camera apparatus 20 is detachably installed in the first sound cavity 102;
where in a case that the camera apparatus 20 is installed in the first sound cavity 102, the sound cavity of the sound-emitting device has a first volume value, in a case that the camera apparatus is separated from the device body, the sound cavity of the sound-emitting device extends toward the first sound cavity and has a second volume value, and the first volume value is smaller than the second volume value.

In the embodiments of the present application, the first sound cavity 102 may be a groove structure formed when one side of the device body 10 is sunken inwards, an opening is formed on the device body 10, and the camera apparatus 20 can be inserted into the first sound cavity 102 through the opening and is installed fixedly in the first sound cavity 102 to fasten the camera apparatus 20 on the device body 10. At the same time, the camera apparatus 20 can also be disassembled from the first sound cavity 102 through the opening, to separate the camera apparatus 20 from the device body 10.

Optionally, the fastening method of the camera apparatus 20 and the device body 10 can be set according to actual needs, for example, the fastening can be achieved by means of snapping, or the fastening can be achieved by means of screws, which is not limited herein, as long as the detachable connection between the camera apparatus 20 and the device body 10 can be realized.

When a larger sound cavity is required, the camera apparatus 20 can be separated from the device body 10, so that the sound cavity of the sound-emitting device extends toward the first sound cavity and has a second volume value. When the camera apparatus 20 needs to be installed on the device body 10 for use, such as charging or data transmission, the camera apparatus 20 can be installed in the first sound cavity 102, and the sound cavity of the sound-emitting device is reduced to the first volume.

In the embodiments of the present application, the camera apparatus 20 is detachably installed in the first sound cavity 102, so that when the camera apparatus 20 needs to be installed and used, the camera apparatus 20 is installed in the first sound cavity 102, and when a larger sound cavity needs to be used, the camera apparatus 20 can be separated from the device body 10. In this way, sound cavity reuse is realized, so that the volume of the electronic device can be reduced, which is beneficial to miniaturized design of the electronic device.

It should be understood that, for the camera apparatus, by sharing space, the volume of the camera apparatus can be appropriately increased, thereby improving the resolution and zoom factor of the camera apparatus. For the sound-emitting device, by sharing space, the sound cavity can be appropriately increased, so that an ultra-low frequency and high-fidelity electro-acoustic system can be realized for the sound-emitting device.

Optionally, in an embodiment, the sound-emitting device has a second sound cavity 1011, the second sound cavity 1011 communicates with the first sound cavity 102, and the device body 10 further includes a baffle 103 adapted to the opening.

In a case that the camera apparatus 20 is separated from the device body 10, the baffle 103 covers the opening, and the sound cavity of the sound-emitting device is formed by the combination of the first sound cavity 102 and the second sound cavity 1011.

In this embodiment, when the camera apparatus 20 is located in the first sound cavity 102, the camera apparatus 20 seals the second sound cavity, and the second sound cavity forms the sound cavity of the sound-emitting device.

Optionally, in an embodiment, the baffle 103 is slidably connected with the device body 10 to move between a first position and a second position, in a case that the baffle is in the first position, the baffle opens the opening, and in a case that the baffle is in the second position, the baffle 103 covers the opening.

When the baffle 103 is in the first position, the camera apparatus 20 can be installed on the device body 10, or the camera apparatus 20 can be separated from the device body 10. Alternatively, the movement of the baffle 103 can be manually controlled, or the movement of the baffle 103 can be driven through setting.

For example, in an embodiment, a drive assembly and a control chip are further provided in the device body 10, the drive assembly is connected with the baffle 103, and the control chip is connected with the drive assembly and is configured to control the drive assembly to drive the baffle 103 to move between the first position and the second position.

Optionally, in an embodiment, the drive assembly includes a motor and a drive circuit adapted to the motor. The rotating shaft of the motor can be connected with the baffle 103. Alternatively, the control chip can output a corresponding control instruction to the drive circuit when an operation command is received from the user, thereby controlling the movement of the baffle 103. The movement of the baffle 103 may be rotational movement or linear movement, which is not further limited herein. For example, in an embodiment, physical or virtual buttons may be provided for the user to input the operation instruction.

Figure 2:
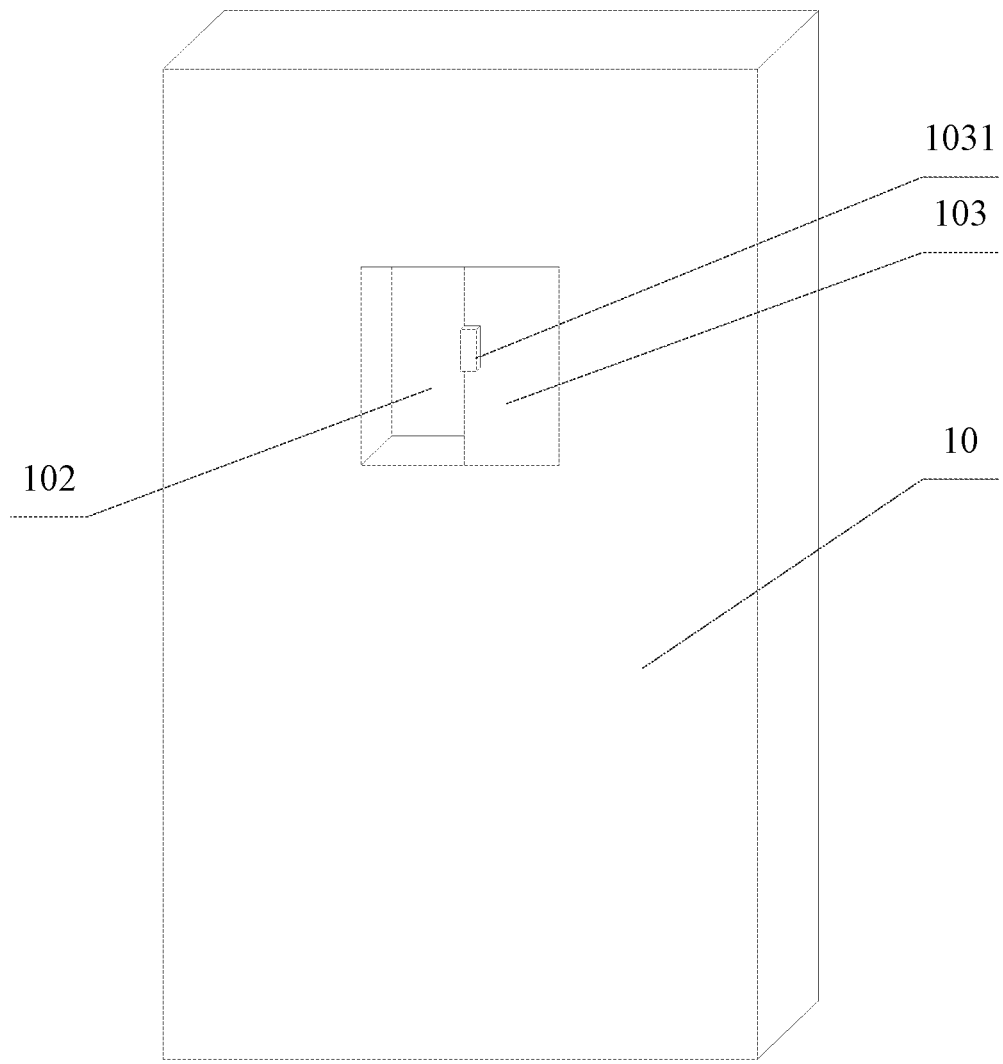
FIG. 2 is a structural diagram of a device body in an electronic device according to an embodiment of the present application.
Figure 3:
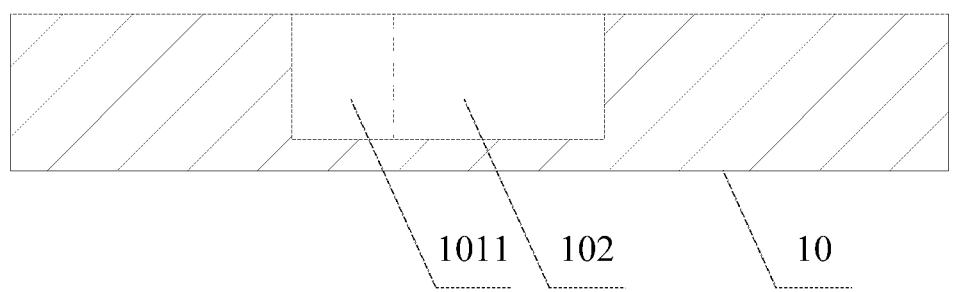
FIG. 3 is a schematic cross-sectional structural diagram 1 of a device body in an electronic device according to an embodiment of the present application.

Of course, in other embodiments, the movement of the baffle 103 may also be controlled manually. The baffle 103 may use a push-pull design, as shown in FIG. 2. In this case, to facilitate the user to exert force to control the movement of the baffle 103, in an embodiment, the baffle 103 is provided with a handle portion 1031, and at least a part of the handle portion 1031 protrudes from the device body 10.

Optionally, in other embodiments, a block can also be designed to be detachably connected with the device body 10, and when the block is installed on the device body 10, the block can cover the opening, so that the first sound cavity 102 and the second sound cavity 1011 are combined to form the sound cavity of the sound-emitting device.

In this embodiment, the device body 10 may be provided with a notch adapted to the handle portion 103 at the opening, and when the baffle 103 is in the first position, the handle portion 103 is located in the notch. Since the notch is provided to accommodate the handle portion 103, the baffle 103 can be prevented from occupying the opening, so that the size of the opening can be reduced.

Further, in an embodiment, the sound cavity of the sound-emitting device is a second sound cavity 1011, the second sound cavity 1011 is made of a deformable material, in a case that the camera apparatus 20 is installed in the first sound cavity 102, the second sound cavity 1011 is squeezed by the camera apparatus 20 to have the first volume value, and in a case that the camera apparatus 20 is separated from the device body 10, the second sound cavity 1011 extends towards the first sound cavity 102 and changes from the first volume value to the second volume value.

Figure 4:
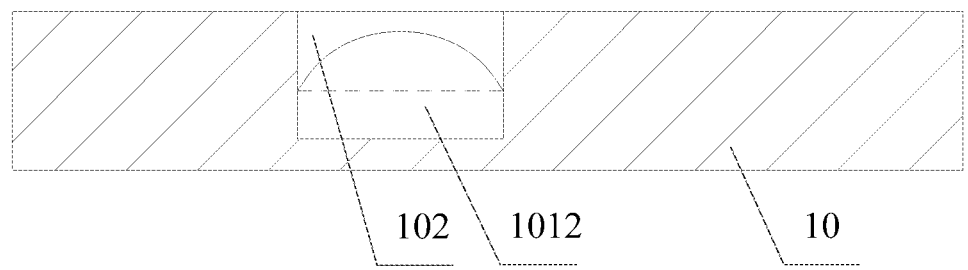
FIG. 4 is a schematic cross-sectional structural diagram 2 of a device body in an electronic device according to an embodiment of the present application.
Figure 5:
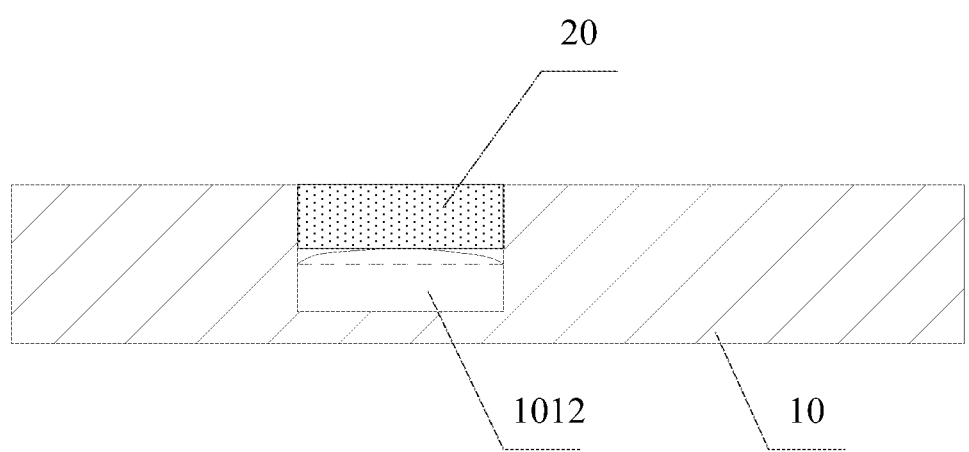
FIG. 5 is a schematic cross-sectional structural diagram 3 of a device body in an electronic device according to an embodiment of the present application.

In this embodiment, the second sound cavity 1011 is a sealed hollow cavity, and the size of the second sound cavity 1011 can be elastically changed. As shown in FIG. 4, when the camera apparatus 20 is separated from the device body 10, a part of the second sound cavity 1011 is located in the first sound cavity 102. As shown in FIG. 5, when the camera apparatus 20 is located in the first sound cavity 102, the camera apparatus 20 squeezes the first sound cavity 102, so that the volume of the first sound cavity 102 is reduced. In this case, a part of the second sound cavity 1011 can be located in the first sound cavity 102, or the entire second sound cavity 1011 may not be located in the first sound cavity 102.

It should be noted that, the positional relationship between the first sound cavity 102 and the second sound cavity 1011 can be set according to actual needs, which is not further limited here.

Optionally, the opening may be provided on the back of the device body. Alternatively, the device body is provided with a display screen, and the back refers to a side of the device body away from the display screen.

Further, in a case that the camera apparatus 20 is installed in the first sound cavity 102, the device body 10 controls the camera apparatus 20 to work, and in a case that the camera apparatus 20 is separated from the device body, the camera apparatus 20 works independent of the device body 10, or the device body 10 controls the camera apparatus 20 to work. Therefore, the camera apparatus 20 can optionally work independent of the device body 10 or work under the control of the device body 10, which is more flexible and convenient to use.

It should be noted that the sound-emitting device may include a coil diaphragm and a magnet, where the coil diaphragm vibrates under the action of the magnetic force of the magnet to generate sound. The size of the sound cavity of the sound-emitting device affects the sound-emitting effect of the sound-emitting component. For example, as the volume of the rear sound cavity constantly increases, the low-frequency peak of the frequency response curve of the sound constantly moves toward the low frequency, so that the low-frequency characteristics can be improved.

In the embodiments of the present application, the installation space of the camera apparatus 20 and the sound cavity of the sound-emitting device share space, thereby improving the space utilization of the electronic device, and providing a solution to the problem of insufficient internal space of the electronic device. Due to space sharing, a camera with a higher resolution and a higher zoom factor can be used, so that the resolution and the zoom factor of the electronic device are not limited, to improve the performance of the camera apparatus 20. Further, through space sharing, the space of the sound cavity of the sound-emitting device is increased, so that an ultra-low frequency and high-fidelity electro-acoustic system can be realized.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An electronic device, comprising: a device body, wherein a sound-emitting device is installed in the device body, a first sound cavity is provided on the device body, and the first sound cavity has an opening that communicates with the outside; and a camera apparatus, wherein the camera apparatus is detachably installed in the first sound cavity; wherein in a case that the camera apparatus is installed in the first sound cavity, the sound cavity of the sound-emitting device has a first volume value, in a case that the camera apparatus is separated from the device body, the sound cavity of the sound-emitting device extends toward the first sound cavity and has a second volume value, and the first volume value is smaller than the second volume value; and the sound-emitting device has a second sound cavity, the second sound cavity communicates with the first sound cavity, and the device body further comprises a baffle slidable to cover the opening.

2. The electronic device according to claim 1, wherein in a case that the camera apparatus is separated from the device body, the baffle covers the opening, and the sound cavity of the sound-emitting device is formed by the combination of the first sound cavity and the second sound cavity.

3. The electronic device according to claim 2, wherein the baffle is slidably connected with the device body to move between a first position and a second position, in a case that the baffle is in the first position, the baffle opens the opening, and in a case that the baffle is in the second position, the baffle covers the opening.

4. The electronic device according to claim 3, wherein a drive assembly and a control chip are further provided in the device body, the drive assembly is connected with the baffle, and the control chip is connected with the drive assembly and is configured to control the drive assembly to drive the baffle to move between the first position and the second position.

5. The electronic device according to claim 4, wherein the drive assembly comprises a motor and a drive circuit adapted to the motor.

6. The electronic device according to claim 3, wherein the baffle is provided with a handle portion, and at least a part of the handle portion protrudes from the device body.

7. The electronic device according to claim 1, wherein the sound cavity of the sound-emitting device is a second sound cavity, the second sound cavity is made of a deformable material, in a case that the camera apparatus is installed in the first sound cavity, the second sound cavity is squeezed by the camera apparatus to have the first volume value, and in a case that the camera apparatus is separated from the device body, the second sound cavity extends towards the first sound cavity and changes from the first volume value to the second volume value.

8. The electronic device according to claim 1, wherein the opening is provided on the back of the device body.

9. The electronic device according to claim 1, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

10. The electronic device according to claim 2, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

11. The electronic device according to claim 3, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

12. The electronic device according to claim 4, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

13. The electronic device according to claim 5, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

14. The electronic device according to claim 6, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

15. The electronic device according to claim 7, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

16. The electronic device according to claim 8, wherein in a case that the camera apparatus is installed in the first sound cavity, the device body controls the camera apparatus to work, and in a case that the camera apparatus is separated from the device body, the camera apparatus works independent of the device body, or the device body controls the camera apparatus to work.

* * * * *